United States Patent
Young et al.

(10) Patent No.: US 7,159,840 B2
(45) Date of Patent: Jan. 9, 2007

(54) SOLENOID HAVING REDUCED OPERATING NOISE

(75) Inventors: Kevin L. Young, Mansfield, OH (US); Scott Baker, Mansfield, OH (US)

(73) Assignee: Stoneridge Control Devices, Inc., Warren, OH (US)

(*) Notice: Subject to any disclaimer, the term of this patent is extended or adjusted under 35 U.S.C. 154(b) by 0 days.

(21) Appl. No.: 11/041,081

(22) Filed: Jan. 21, 2005

(65) Prior Publication Data
US 2006/0054851 A1   Mar. 16, 2006

Related U.S. Application Data

(60) Provisional application No. 60/610,092, filed on Sep. 15, 2004.

(51) Int. Cl.
*F16K 31/00* (2006.01)

(52) U.S. Cl. ................. 251/129.02; 251/64

(58) Field of Classification Search .......... 251/64, 251/129.02, 129.15, 129.17, 129.19, 330
See application file for complete search history.

(56) References Cited

U.S. PATENT DOCUMENTS

| | | | | |
|---|---|---|---|---|
| 2,826,215 A | * | 3/1958 | Wolfslau et al. ......... | 137/454.6 |
| 4,312,380 A | * | 1/1982 | Leiber et al. ............ | 137/627.5 |
| 5,915,669 A | * | 6/1999 | Zabeck et al. ......... | 251/129.16 |
| 6,065,734 A | * | 5/2000 | Tackett et al. ......... | 251/129.02 |

OTHER PUBLICATIONS

International Search Report with Written Opinion, dated May 5, 2006, received in corresponding PCT application. (7 pages).

* cited by examiner

*Primary Examiner*—Edward K. Look
*Assistant Examiner*—John K. Fristoe, Jr.
(74) *Attorney, Agent, or Firm*—Grossman, Tucker & Perrault & Pfleger, PLLC

(57) ABSTRACT

A solenoid valve is provided generally including a bobbin for supporting a coil and a core located adjacent to the bobbin. An armature is movably disposed relative to the core. A plunger is coupled to the armature and movable with the armature. A seal is coupled to the plunger, with the seal movable between an open position and a closed position sealingly engaged with a valve seat. The solenoid valve further includes a plunger damper which includes a resilient feature that is configured to engage the plunger when the seal moves toward the closed position. The plunger damper may damp, or cushion, any impact between the seal and the valve seat.

16 Claims, 6 Drawing Sheets

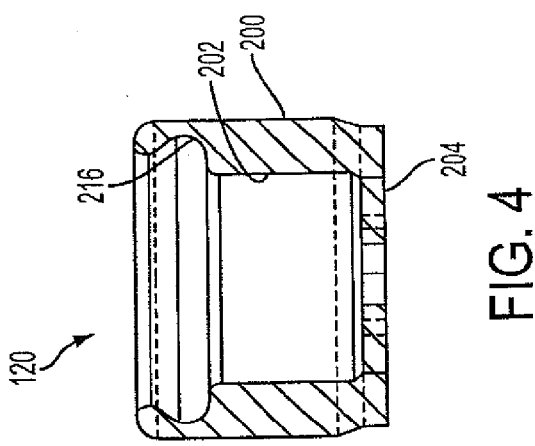
FIG. 3
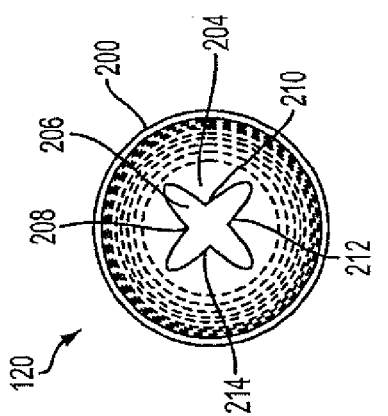
FIG. 4
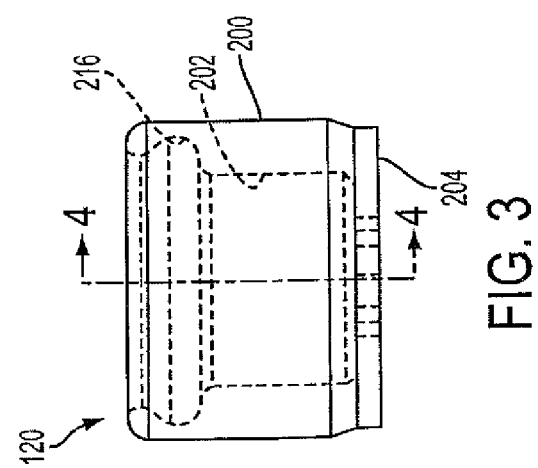
FIG. 5
FIG. 6
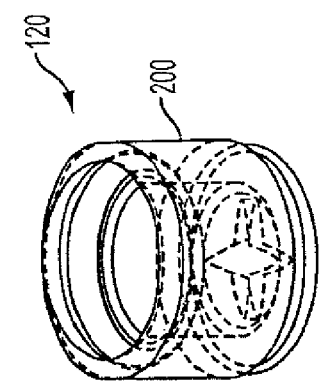
FIG. 7

SOLENOID HAVING REDUCED OPERATING NOISE

CROSS-REFERENCE TO RELATED APPLICATIONS

This application claims the benefit of U.S. Provisional Application Ser. No. 60/610,092, filed Sep. 15, 2004, the teachings of which are incorporated herein by reference.

FIELD

The present disclosure relates to solenoids, and more particularly to solenoid valves.

BACKGROUND

Solenoids are used in a myriad of applications in the automotive industry. For example, solenoids may be used for high power switches with a lower power control signal. Solenoids are also used in automated or remote valves, such as a canister vent solenoid associated with evaporative emission control systems. Such solenoid valves may be used to control the flow of a variety of fluids or gasses. For example, in the context of a canister vent solenoid, the solenoid valve may be used to control the flow of fuel vapors into a charcoal canister. Solenoid valves may be similarly used to control the flow of liquids and vapors for other vehicle systems.

During operation, the solenoid armature may move a seal on a plunger to engage and disengage a valve seat. Generally, when the seal is engaged with the valve seat the solenoid valve is in a closed condition, and when the seal is disengaged from the valve seat the solenoid valve is in an opened condition. The opening and closing of the solenoid valve may create various audible noises. For example, when the valve is closed, the seal may slap against the valve seat. Similarly, when the valve is opened, the armature may impact a portion or the bobbin, thereby creating a clicking noise. The audible noises associated with the various mechanical components of a motor vehicle are often considered undesirable, and the elimination of such audible noises may generally be considered to be beneficial.

BRIEF DESCRIPTION OF THE DRAWINGS

Features and advantages of solenoids consistent with the present disclosure will be apparent from the following description of embodiments consistent therewith, wherein:

FIG. 3 is a front elevation view of an embodiment of a plunger damper consistent with the present disclosure;

FIG. 4 is a sectional view along section line 4—4 of the plunger damper illustrated in FIG. 3;

FIG. 5 is a top view of the plunger damper illustrated in FIG. 3;

FIG. 6 is a bottom view of the plunger damper shown in FIG. 3;

FIG. 7 is a perspective view of the plunger damper of FIG. 3;

DESCRIPTION

In general, the present disclosure may provide a solenoid having reduced audible operating noise. Particularly, a solenoid consistent with the present disclosure may include damping features configured to reduce audible noise associated with moving components of the solenoid impacting against other components during the operation of the solenoid. For example, damping features may be provided to reduce the audible noise associated with one or more of a valve seal striking a valve seat during closing of the valve, an armature striking an upper bobbin portion or a stop during opening of the valve, impact between a plunger and the armature during either opening or closing of the valve, etc. While the description herein is set forth in the context of a solenoid valve, such as a canister vent solenoid, the damping features consistent with the present disclosure are susceptible to application in solenoid mechanisms and systems in general, and should not be limited to solenoid valves.

Figure 1:
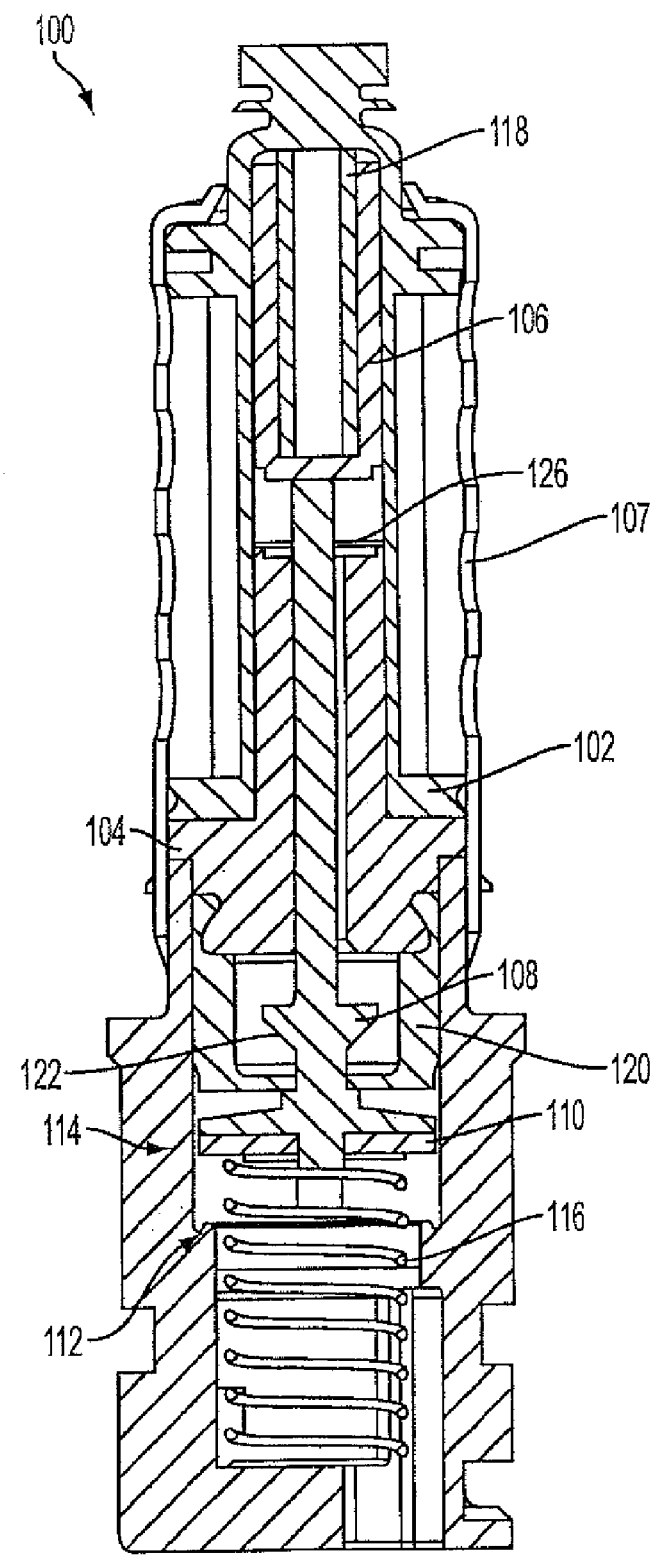
FIG. 1 is a cross-sectional view of an embodiment of a solenoid valve consistent with the present disclosure in an opened configuration.

Referring to the drawings, FIG. 1 illustrates a cross-sectional view of an embodiment of a solenoid 100 consistent with the present disclosure. The solenoid 100 may include a bobbin 102 supporting a coil (not shown). A solenoid core 104 may be disposed adjacent the bobbin 102, for example, the core 104 may be disposed at least partially within the bobbin 102 as shown in the illustrated embodiment. Other configurations may also suitably be employed. An armature 106 may be movably disposed relative to the core 104. For example, the armature 106 may be slidably disposed at least partially within the bobbin 102. At least a portion of the bobbin 102 and/or the core 104 may be surrounded by a bracket or magnetic frame 107.

The armature 106 may be coupled to a plunger 108, such that the movement of the armature 106 in at least one direction may also move the plunger 108 in at least one direction. Such an arrangement does not, however, require the armature 106 to be physically joined to the plunger 108. The plunger 108 may carry a seal 110 that may seal against a valve seat 112 to close a valve including the seal 110 and valve seat 112. Accordingly, the seal 110 may be coupled to the armature 106 by the plunger 108. Correspondingly, the seal 110 may be moved away from the valve seat 112 to thereby open the valve. The valve seat 112 and seal 110 carried by the plunger 108 may be at least partially disposed in a valve body 114. The plunger 108 may be biased toward the armature 106 by a return spring 116. The return spring 116 may bias the valve toward an open condition, e.g., in which the seal 110 is at least partially spaced from the valve seat 112 in the illustrated embodiment.

Figure 2:
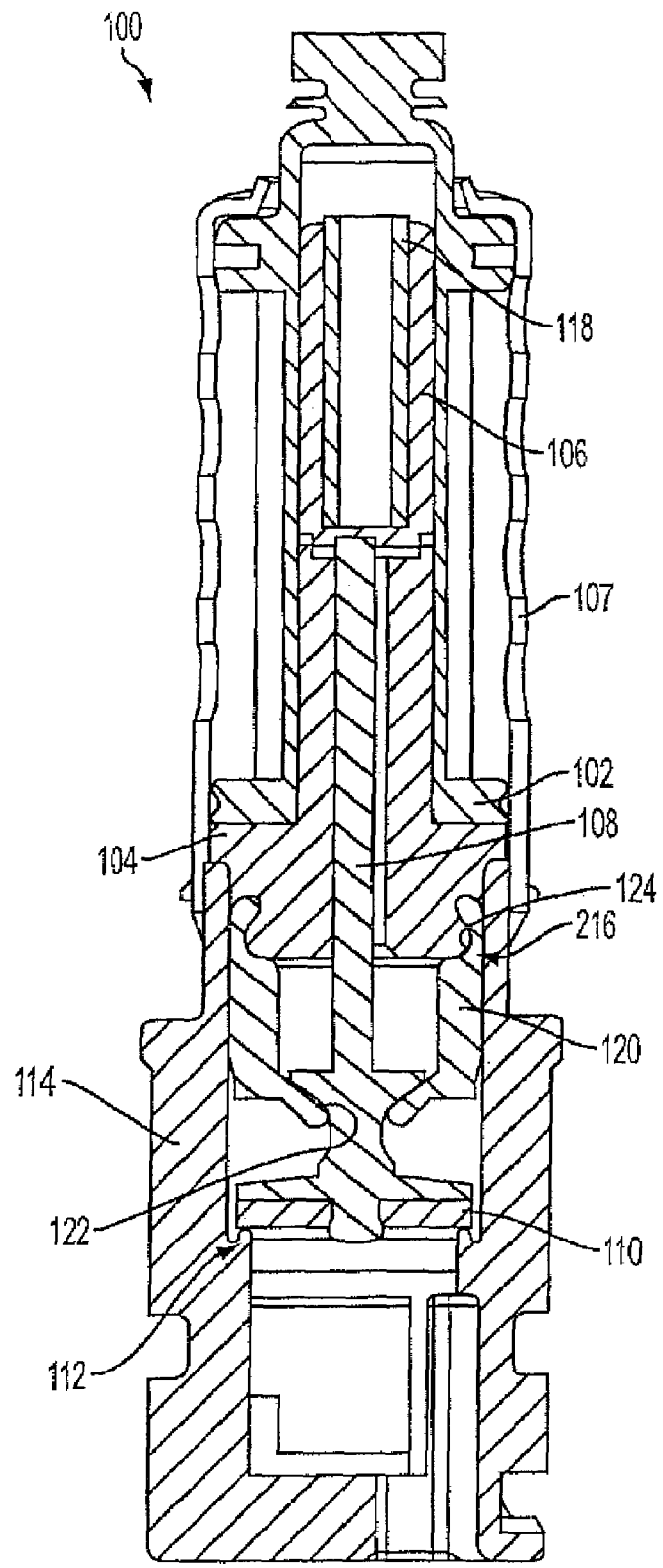
FIG. 2 is a cross-sectional view of an embodiment of a solenoid valve consistent with the present disclosure in a closed configuration.

When the coil is not energized, the return spring 116 may bias the plunger 108, and the armature 106 via the plunger 108, to a first position, i.e., an opened configuration, in which the plunger 108 and armature 106 are positioned toward the end of the solenoid 100 away from the valve seat 112, as shown in FIG. 1. When the coil carried by the bobbin 102 is energized, the magnetic field induced in the core 104 may move the armature 106, and the plunger 108 acted upon by the armature 106, against the biasing force of the return spring 116 to a second position, i.e., a closed configuration, in which the armature 106 and plunger 108 are positioned toward the valve seat 112, as shown in FIG. 2.

According to one aspect, the solenoid 100 may include an armature damper 118. The armature damper 118 may be configured to damp contact between the armature 106 and the upper portion of the bobbin 102 during the return cycle of the solenoid 100, i.e., when armature 106 is returned to the first position thereof by the return spring 116. Consistent with the present disclosure, the armature damper 118 may be an elastic member that may cushion the armature so that the armature 106 does not impact the upper bobbin. Consistent with the illustrated embodiment, the armature damper 118 may be configured as a tube disposed at least partially within an opening extending into the armature 106 and extending at least partially beyond the armature 106. The tubular configuration of the armature damper 118 may allow at least partial buckling of the damper 118, thereby increasing the cushioning effect of the damper 118. Alternative configurations may also be used for the armature damper 118 herein.

According to one embodiment of a solenoid 100 consistent with the present disclosure, the armature damper 118 may be and elastomeric material having a durometer of between about 50–70 on the Shore A scale. The hardness of the armature damper 118 may vary, however, depending upon the design and size of the armature damper 118, as well as the particular application of the solenoid 100. An armature damper 118 according to the present disclosure may be formed from any suitable elastic material, e.g., an elastomer. Exemplary elastomers may include, for example, Viton™ elastomer available from DuPont Dow Elastomers, nitrile elastomers, epichlorohydrin elastomer, e.g., Hydrin™ available from Zeon Chemicals, as well as numerous other elastomeric materials.

According to another aspect, a solenoid 100 consistent with the present disclosure may be provided having a plunger damper 120. The plunger damper 120 may be configured to slow the pull-in speed of the plunger 108 when the solenoid 100 is energized to move to plunger 108 to a closed condition, i.e., a condition wherein the seal 110 is disposed against the valve seat 112. Slowing the pull-in speed of the plunger 108 in the foregoing manner may prevent the seal 110 from slapping the valve seat 112.

Referring to FIGS. 3 through 7, the plunger damper 120 may generally be configured as an elastomeric body 200 having an inner wall 202 that may define an interior opening. The elastomeric body 200 may additionally include a bottom portion 204 having an opening 206 therethrough. Consistent with the illustrated embodiment, the opening 206 may be star-shaped, having a plurality of fingers, e.g., triangular fingers 208, 210, 212, 214, extending into the opening 206.

Consistent with the illustrated embodiment, the plunger 108 may include a flange 122 that may include a tapered surface facing toward the seal 110. The flange 122 may be sized to be at least partially received in the interior opening of the plunger damper 120 defined by the interior wall 202 thereof. Referring to FIG. 2, when the solenoid 100 is energized and the plunger 108 may be moved toward the valve seat 112. The flange 122 of the plunger 108 may engage the fingers 208, 210, 212, 214 of the opening 206 in the bottom portion 204 of the plunger damper 120. The fingers 208, 210, 212, 214 of the plunger damper 120 may be deflected in the direction of the valve seat 112 by the flange 122 of the plunger 108 pressing against the fingers 208, 210, 212, 214. As the plunger 108 moves toward a closed configuration, the increasing diameter of the tapered surface of the flange 122 passing through the opening of the plunger damper 120 may produce an increasing resistance force between the flange 122 of the plunger 108 and the fingers 208, 210, 212, 214 of the plunger damper 120. The increasing resistance force between the plunger 108 and the plunger damper 120 may cause the plunger 108 to slow down as the seal 110 approaches and contacts the valve seat 112. According to one embodiment, the resistance force between the plunger 108 and the plunger damper 120 may not prevent the seal 110 from engaging the valve seat 112, thereby closing the valve. The resistance between the plunger 108 and the plunger damper 120 may, however, reduce an impact between the seal 110 and the valve seat 112, and may thereby reduce an audible noise resulting from an impact between the seal 110 and the valve seat 112 when the seal 110 is moved into contact with the valve seat 112.

A plunger damper 120 consistent with the present disclosure may also slow the withdrawal of the plunger 108 away from the valve seat 112. The fingers 208, 210, 212, 214 of the plunger damper 120 may produce drag against the tapered surface 122 of the plunger 108 as the plunger 108 returns to an open configuration, such as shown in FIG. 1. The drag or resistance of the plunger damper 120 on the plunger 108 during the return of the plunger 108 to an open configuration may decrease the initial acceleration of the plunger 108 and/or reduce the maximum velocity of experienced by the plunger 108 during return to an open configuration. Reduction of initial acceleration and/or maximum velocity of the plunger during the return cycle may reduce any impact of the armature 106 and/or armature damper 118 against to upper portion of the bobbin 102 at the end of stroke.

As with the armature damper 118, the plunger damper 120 may be formed from an elastomeric material having a durometer of between about 50–70 on the Shore A scale. Similar to the armature damper 118, the hardness of the plunger damper 120 may vary depending upon design and size of the plunger damper 120 as well as the application of solenoid 100. Accordingly, the hardness of the plunger damper 120 may be greater than the 70 on the Shore A scale or less than 50 on the Shore A scale. Also similar to the armature damper 118, a plunger damper 120 consistent with the present disclosure may be formed from any suitable elastomeric material. Exemplary elastomers may include, for example, Viton™ elastomer available from DuPont Dow Elastomers, nitrile elastomers, epichlorohydrin elastomer, e.g., Hydrin™ available from Zeon Chemicals, as well as numerous other elastomeric materials.

Consistent with the illustrated embodiment, the plunger damper 120 may be incorporated into a solenoid 100 without requiring changes to the valve body 114. According to this aspect, the plunger damper 120 may be either directly or indirectly coupled to the core 104 and/or the valve body 114. As depicted in the drawings, the plunger damper 120 may include an undercut region 216 in an upper portion of the inner wall 202 of the plunger damper 120. The solenoid core 104 may have a cooperating protrusion 124 that is configured to be at least partially received in the undercut region 216 of the plunger damper 120, thereby directly coupling the plunger damper 120 to the core 104. The protrusion 124 of the core 104 may include a continuous protrusion around the entire perimeter of the core 104, or may include one or more discrete protrusions extending around only a portion of the perimeter of the core 104. The plunger damper 120 may be assembled to the core 104 outside of the valve body 114, wherein the elastic character of the plunger damper 120 may allow the plunger damper 120 to elastically deform to receive the protrusion 124 of the core 104 in the undercut region 216 of the plunger damper 120. The assembled plunger damper 120 and core 104 may be at least partially inserted into the valve body 114. When the plunger damper 120 and core 104 are at least partially inserted into the valve body 114, the valve body 114 may prevent the plunger damper 120 from elastically deforming to release the protrusion 124 of the core 104 from the undercut region 216. In this manner, the plunger damper 120 may be retained to the core 104 even under repeated stress of the plunger 108 pressing against the fingers 208, 210, 212, 214 of the plunger damper 120. Various other approaches may alternatively, or additionally, be employed for directly or indirectly coupled the plunger damper 120 to the valve body 114, core 104, or other feature of the solenoid 100.

According to one embodiment, the plunger 108 may not be affixed to the armature 106. In such an embodiment, the plunger 108 and the armature 106 may impact against one another during operation of the solenoid 100. Such an impact between the plunger 108 and the armature 106 may create an audible noise and/or may produce an undesired stress on the plunger 108, the armature 106, and/or another component of the solenoid 100. Therefore, according to another aspect of the present disclosure, the armature 106 may be coupled to the plunger 108. In one such embodiment, the plunger 108 may be indirectly coupled to the armature 106 through an armature/plunger damper (not shown). The armature/plunger damper may be an elastomeric material, similar to the elastomeric materials employed for the armature damper 118 and/or the plunger damper 120 described above. The armature/plunger damper may cushion an impact between the plunger 108 and the armature 106. According to one embodiment, the armature/plunger damper may be molded or fitted to the armature 106 and/or the plunger 108 to provide a cushion between the armature 106 and the plunger 108. Other configurations may be employed herein to cushion an impact between the plunger 108 and the armature 106 to reduce audible noise, impact stress, etc. caused by such an impact.

According to another aspect, the solenoid 100 may include a damper 126 arranged to cushion an impact between the armature 106 and the core 104, for example during closing of the valve. Such a damper 126 may include an elastomeric member disposed between the core 104 and the armature 106. The damper 126 may be fixed to either of the core 104, as shown in the illustrated embodiment, to the armature 106, or may be free floating in between the core 104 and the armature 106 and not fixed to either. According to a first embodiment, the damper 126 may be configured as an elastomeric pad, for example a disk, disposed between the core 104 and the armature 106. The elastomeric pad may be located via an opening through the pad, through which the plunger 108 may pass. According to an alternative embodiment, the damper 126 may include an elastomeric tubular member. The tubular member may be provided having a height and wall thickness that may allow the tubular member to at least partially buckle under an impact between the core 104 and the armature 106, thereby providing a greater cushioning effect.

Figure 8:
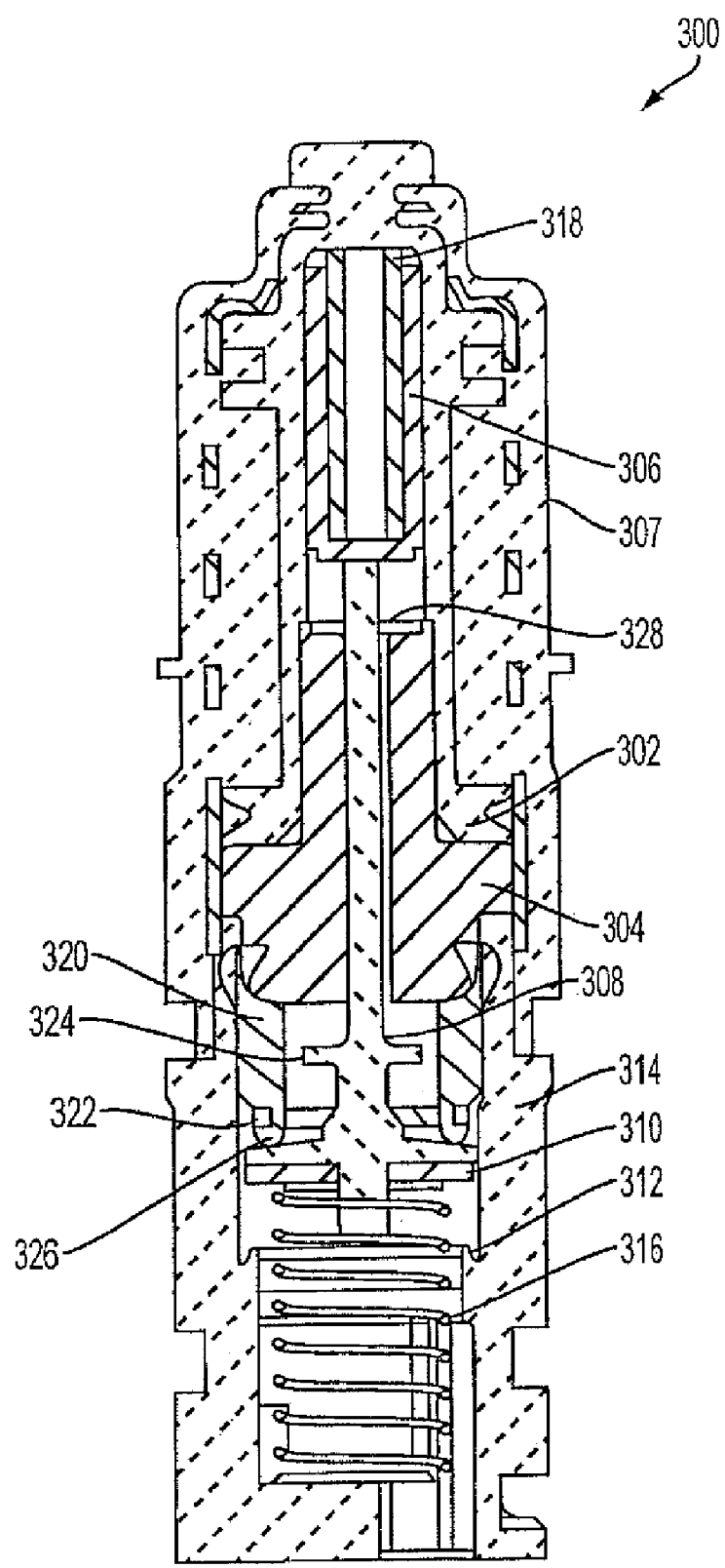
FIG. 8 is a cross-sectional view of another embodiment of a solenoid consistent with the present disclosure.

Turning to FIG. 8, another embodiment of a solenoid 300 providing reduced operating noise is illustrated in a cross-sectional view. The solenoid 300 may generally be configured similar to the previously described embodiment. As such, the solenoid 300 may generally include a bobbin 302 supporting a coil (not shown) and having a core 304 adjacent the bobbin 302, or partially received in the bobbin 302 as in the illustrated embodiment. At least a portion of the bobbin 302 and/or the core 304 may be disposed in a housing or casing 307. An armature 306 may be slidably disposed in at least a portion of the bobbin 302. The armature 306 may be in contact with and/or coupled to a plunger 308. The plunger 308 may carry a seal 310. A portion of the plunger 308 carrying the seal 310 may be at least partially disposed in a valve body 314 that may include a valve seat 312. When the solenoid 300 is energized the armature 306 may move toward the core 304, and thereby move the plunger 308 toward the valve seat 312. This movement of the armature 306 and plunger 308 may cause the seal 310 to sealingly engage the valve seat 312. The solenoid 300 may additionally include a return spring 316 that may move the seal 310, and therein also the plunger 308 and armature 306, away from the valve seat 312 when the solenoid 300 is not energized.

Also similar to the preceding embodiment, the solenoid 300 may include one or more damping components that may act to cushion an impact between various components of the solenoid 300 during operation thereof. According to embodiments consistent with the present disclosure, the cushioning provided by the damping components may, at least in part, reduce at least some of the audible noises associated with the operation of the solenoid 300. Consistent with the illustrated embodiment, the solenoid 300 may include an armature damper 318 that may be configured to cushion an impact between the armature 306 and an upper portion of the bobbin 302. As described above, the armature damper 318 may include an elastomeric tube coupled to the armature 306, as by being at least partially received in an opening in an upper portion of the armature 306. Alternatively, the armature damper may include an elastomeric rod, pad, etc. that may cushion an impact between the armature 306 and an upper portion of the bobbin 302.

According to another aspect, the solenoid 300 may include a plunger damper including a plastic retainer 320 supporting a damping disk 322. The plastic retainer 320 may be a generally tubular polymeric material. According to one embodiment, the plastic retainer 320 may be formed from a rigid polymeric material, such as nylon, etc. In addition to plastic, the retainer 320 may also be fabricated from other rigid, or semi-rigid, materials, including metals, ceramics, etc. Similar to the previously described plunger damper, the plastic retainer 320 may be either directly or indirectly coupled to the core 304. In the illustrated embodiment, the plastic retainer 320 is directly coupled to the core 304 by an undercut in the retainer 320 and a cooperating protrusion on the core 304. Other arrangements and configurations may also be used for maintaining the plastic retainer 320 in a desired position relative to the core 304, or other feature of the solenoid 300.

The damping disk 322 may be a resilient member such as an elastomeric member. According to one embodiment, the damping disk 322 may be formed from a fuel resistant rubber material, although other elastomeric materials may also suitable be employed. The damping disk 322 may be coupled to the plastic retainer 320 in order to maintain the damping disk 322 in a desired position within the solenoid 300. In the illustrated embodiment, the damping disk 322 is shown directly coupled to the plastic retainer 320. As shown, the damping disk 322 may be directly coupled to the plastic retainer 320 via a plurality of hooks or barbed features, e.g., 326, that may pass through respective openings through the disk 322. While not necessary, the damping disk 322 may be stretched slightly to receive the hooks 326 of the plastic retainer 320. The spring force of the stretched damping disk 322 may increase the strength of the engagement between the damping disk 322 and the plastic retainer 320. The damping disk 322 may also include an opening therethrough, allowing the plunger 308 to extend through the damping disk 322. The opening in the damping disk 322 may have any desired geometry, including circular, polygonal, etc. Furthermore, the opening in the damping disk 322 may include one or more slits allowing at least a portion of the plunger 308 to be pressed through the damping disk 322. According to such a configuration, the damping disk 322 may elastically, or plastically, deform around the portion of the plunger 308 extending through the damping disk 322.

The plunger 308 may include a flange 324 extending radially from the longitudinal shaft thereof. The plunger flange 324 may be a generally planar projection, as in the illustrated embodiment. Alternatively, the plunger flange 324 may have a tapered, arcuate, etc. surface that may diverge away from the valve seat 312. As also shown in the illustrated embodiment, the plunger flange 324 may be disposed on the side of the damping disk 322 facing the bobbin 302 when the solenoid is in an un-energized, or opened, condition.

When the solenoid 300 is energized, the armature 306 may be moved in the direction of the valve seat 312, and may also push the plunger 308 toward the valve seat 312. As the plunger moves toward the valve seat 312 the plunger flange 324 may engage the damping disk 322. The engagement of damping disk 322 by the plunger flange 324 may prevent the plunger 308 from sliding through the opening in the damping disk 322. Accordingly, the plunger flange 324 may apply a force to the damping disk 322 in the direction of travel, e.g., toward the valve seat 312. The force applied by the plunger flange 324 may force the damping disk 322 to elastically or resiliently deform or deflect in the direction of travel of the plunger, i.e., toward the valve seat 312. The elastic resistance, or spring constant, of the damping disk 322 may resist deformation in the direction of travel of the plunger 308. The resistance to deformation provided by the damping disk 322 against the plunger flange 324 may decrease the speed of travel of the plunger 308 toward the valve seat 312. The decrease in the speed of the plunger 308 as the plunger 308 approaches the valve seat 312 may reduce the speed of impact and/or the impact force of the seal 310 against the valve seat 312, during closing of the valve. The reduction in speed and/or force of impact between the seal and the valve seat 312 may reduce or eliminate audible noise resulting from the seal 310 closing against the valve seat 312.

Figure 9:
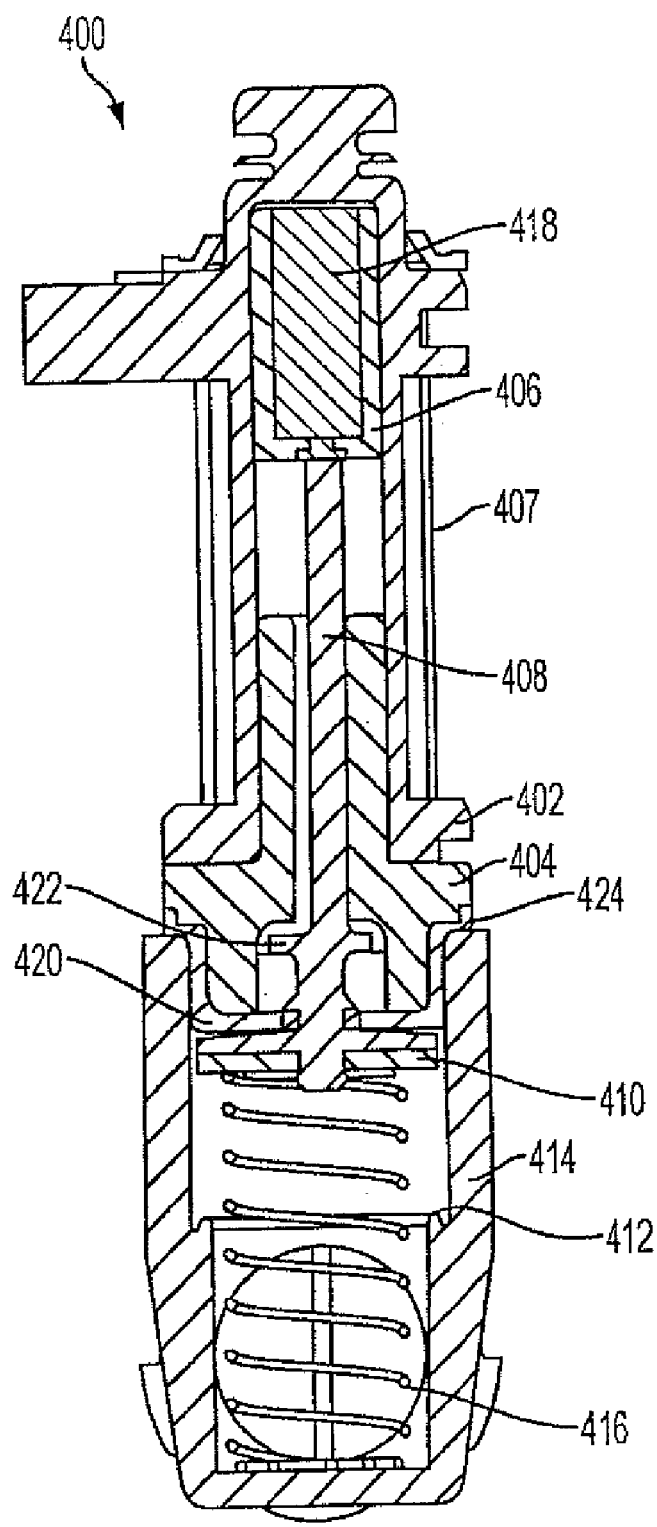
FIG. 9 is a cross-sectional view of yet another embodiment of a solenoid consistent with the present disclosure.

Turning to FIG. 9, yet another embodiment of a solenoid 400 is shown. Similar to the previously described embodiments, the solenoid 400 may generally include a bobbin 402 for supporting a coil (not shown). A core 404 may be disposed adjacent the bobbin 402 and/or at least partially received within the bobbin 402. A housing or casing 407 may be disposed around at least a portion or the bobbin 402 and/or at least a portion of the core 404. An armature 406 may be slidable disposed at least partially within the bobbin 402, and a plunger 408 may be coupled to the armature 404, and/or in contact with the armature 404 such that the plunger 408 may be slidably movable with the armature 404 in at least one direction. The plunger 408 may include a seal 410 configured to engage and seal against a valve seat 412 within a valve body 414. In one embodiment, at least a portion of the plunger 408 including the seal 410 may be disposed at least partially within the valve body 414 even when the seal 410 is not engaged with the valve seat 412.

The solenoid 400 may be energized by providing an electric current through the coil at least partially supported by the bobbin 402. When the solenoid 400 is energized, the armature 406 may move toward the solenoid core 404 and thereby move the plunger 408 toward the valve seat 412. Movement of the plunger toward the valve seal 412 may allow the seal 410 to contact and/or engage the valve seat 412, thereby closing the valve. The solenoid 400 may further include a return spring 416 biasing the plunger 408, via the seal 410, toward the bobbin 402. When the solenoid 400 is not energized, the return spring 416 may move the seal 410, and therein may also move the plunger 408 and armature 406, in the direction of the bobbin 404. The seal 410 may be moved out of engagement with the valve seat 412 by the biasing force of the return spring 416 when the solenoid 400 is not energized. In this manner, the return spring 416 may open the valve, and maintain the valve in an opened condition, when the solenoid 400 is not energized.

The solenoid 400 may include an armature damper 418 disposed between the armature 406 and the top of the bobbin 402. The armature damper 418 may include an elastomeric member that may damp and/or cushion contact between the armature 406 and the top of the bobbin 402. For example, when the armature 406 is driven away from the valve body 414 by the return spring 416 the armature damper 418 may damp any contact and/or impact between the armature 406 and the top of the bobbin 402. Damping any contact and/or impact between the armature 406 and the top of the bobbin 402 may reduce noise associated with contact and/or impact between the armature 406 and the top of the bobbin 402. The armature damper 418 may suitably be provided as an elastomeric tube, rod, pad, etc. that may be coupled to and/or disposed at least partially within the armature 406. Alternatively, the armature damper may be coupled to and/or associated with the top of the bobbin. According to this latter embodiment, the armature damper may remain stationary with the bobbin rather than moving with the armature.

The solenoid 400 may also include a plunger damper 420 for damping and/or cushioning any contact and/or impact between the seal 410 and the valve seat 412. According to one embodiment, the plunger damper 420 may be configured in a manner similar to the damper illustrated in FIGS. 3 through 7. That is, the plunger damper 420 may include a plurality elastomeric fingers, protrusions, or the like. The plunger 408 may include a flange 422 that may engage the elastomeric fingers as the plunger 408 is moved toward the valve seat 412 when the solenoid 400 is energized. The fingers of the plunger damper 420 may resiliently deflect toward the valve seat 412 when engaged by the plunger flange 422. The elastomeric fingers may exhibit a spring force and may resist deflect by the plunger flange 422. According to such an embodiment, the plunger flange 422 may have a generally flat contacting surface as in the illustrated embodiment. Alternatively, the plunger flange 422 may have an arcuate or tapered surface facing the plunger damper 420.

Consistent with an embodiment herein, the resistance provided by the deflecting fingers may increase with increasing travel of the plunger 408 toward the valve seat 412. The increasing resistance provided by the fingers of the plunger damper 420 may slow the travel of the plunger 408 as the seal 410 approaches the valve seat 412. The combination of the resistance provided by the plunger damper 420 and the decrease in velocity of the seal 410 when the seal 410 contacts the valve seat 412 may reduce an impact between the seal 410 and the valve seat 412. The reduction in the impact between the valve seat 412 and the seal 410 may reduce noise caused by the seal 410 closing against the valve seat 412.

According to another embodiment, the plunger damper 420 may be configured in a manner similar to the plunger damper disclosed with reference to FIG. 8. For example, the plunger damper 420 may include a resilient diaphragm or membrane that may be engaged by the plunger flange 422 when the solenoid 400 is energized and the plunger 408 is moved toward the valve seat 412. Rather than resiliently deflecting a plurality of fingers as in the preceding embodiment, the resilient diaphragm or membrane of the plunger damper may resiliently deflect in the direction of the valve seat 412. Similar to the preceding embodiment, the plunger damper 420 may provide a spring force that may resist deflection in the direction of the valve seat 412. The resistance to deflection provided by the plunger damper 420 may damp and/or cushion a contact and/or impact of the seal 410 against the valve seat 412, and may, therefore, reduce noise resulting from the contact and/or impact of the seal 410 against the valve seat 412.

Consistent with either embodiment, the resistance to deformation provided by the plunger damper 420 against the plunger flange 422 may decrease the speed of travel of the plunger 408 toward the valve seat 412. The decrease in the speed of the plunger 408 as the plunger 408 approaches the valve seat 412 may reduce the speed of impact and/or the impact force of the seal 410 against the valve seat 412, during closing of the valve. The reduction in speed and/or force of impact between the seal and the valve seat 412 may reduce or eliminate audible noise resulting from the seal 410 closing against the valve seat 412.

In one embodiment consistent with the present disclosure, the plunger damper 420 may be provided as a generally thimble-shaped or cupped elastomeric body. The plunger damper 420 may further include an outwardly extending lip or flange 424. The flange 424 of the plunger damper 420 may be disposed between the valve body 414 and the core 404 of the solenoid 400. According to one embodiment, at least a portion of the plunger damper 420 may have a geometry that generally corresponds to the shape of at least a portion of the interface between the core 404 and the valve body 414. When the plunger damper 420 is positioned between the core 404 and the valve body 414, the conforming geometry of the plunger damper 420 may retain the plunger damper 420 in position between the core 404 and the valve body 414. Additionally, or alternatively, the flange 424 may be clamped by the valve body 414 and the core 404, thereby further retaining the plunger damper 420 in position. In the foregoing manner, at least a portion of the plunger damper 420 may be captured between the core 404 and the valve body 414, thereby retaining the plunger damper 420 in position.

Figure 10:
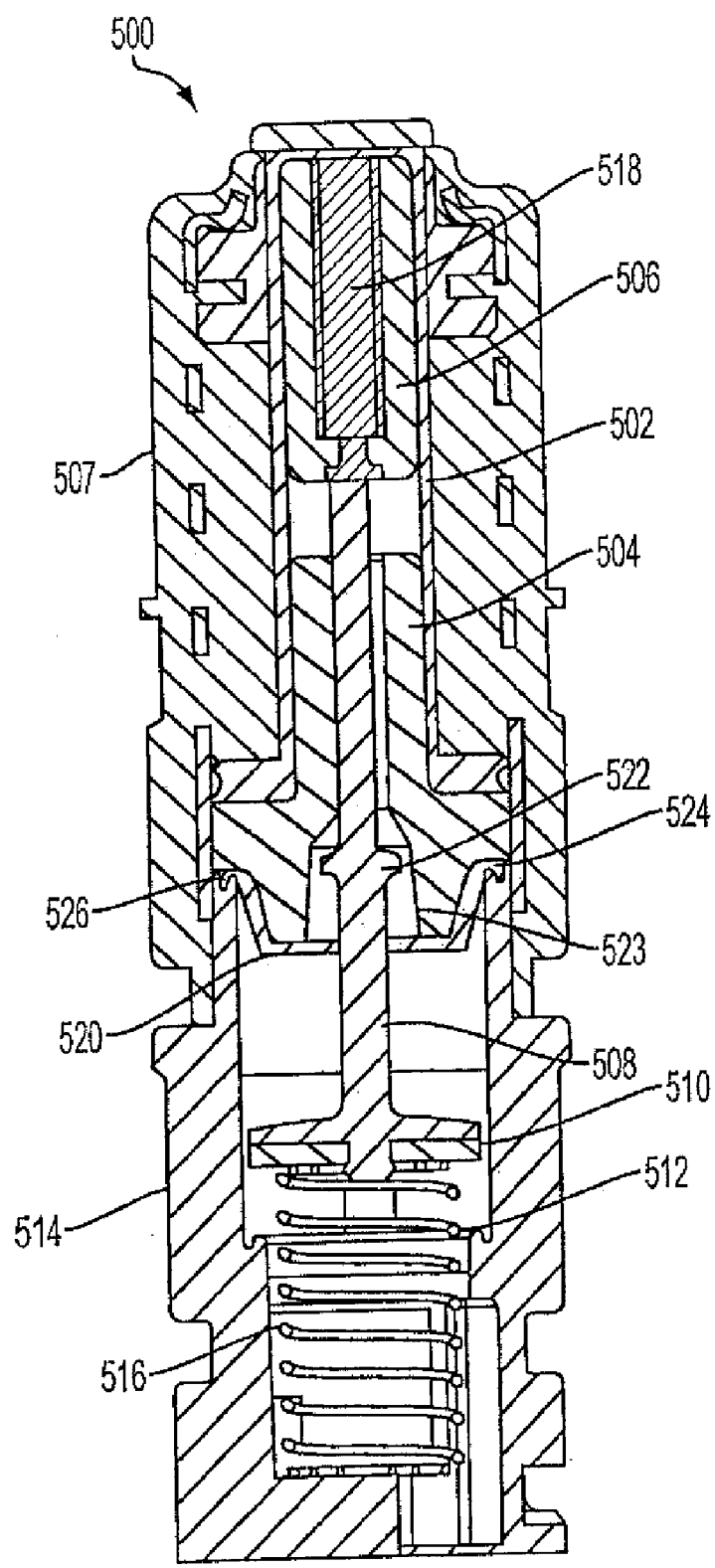
FIG. 10 is a cross-sectional view of still another embodiment of a solenoid consistent with the present disclosure.

Referring next to FIG. 10, another embodiment of a solenoid 500 is depicted in cross-sectional view. As with the previously described embodiments, the solenoid 500 may generally include a bobbin 502 capable of supporting a coil. A core 504 may be disposed adjacent to the bobbin 502, and/or the core 504 may be disposed at least partially within the bobbin 502. An armature 506 may be movable disposed relative to the core 504. In one embodiment, and as shown in FIG. 10, the armature 506 may be slidably disposed at least partially within the bobbin 502. A first end of a plunger 508 may be either directly or indirectly coupled to the armature 506. The second end of the plunger 508 may include a seal 510 that is configured to sealing engage a valve seat 512 of a valve body 514, i.e., to close the valve, when the coil of the solenoid 500 is energized by providing an electric current through the coil. The solenoid 500 may further include a return spring 516. The return spring 516 may bias the seal 510 toward a position in which the seal 510 is disengaged from the valve seat 512 by a return spring 516. The plunger 508 and the armature 506 may similarly be biased away from the valve seat 512 by the return spring 516. At least a portion of the seal 510 and/or the plunger 508 may be at least partially disposed within the valve body 514 when the seal 510 is engaged with the valve seat 512 and/or when the seal 510 is disengaged from the valve seat 512.

Also similar to previously described embodiments, the solenoid 500 may include an armature damper 518 for cushioning a contact and/or impact between the armature 506 and an upper portion of the bobbin 502 and/or of a housing or casing 507 surrounding at least a portion of the bobbin 502. Such a contact and/or impact may be associated with an opening of the valve. The armature damper 518 may be formed from an elastomeric material. As depicted in FIG. 10, the plunger 508 may be indirectly coupled to the armature 506 through the damper 518. Accordingly, in addition to cushioning a contact and/or impact between the armature 506 and a portion of the bobbin 502 and/or housing 507, the damper 518 may reduce and/or eliminate audible noise associated with a contact and/or impact between the plunger 508 and the armature 506.

The solenoid 500 may also include a plunger damper 520 for cushioning contact and/or impact between the seal 510 and the valve seat 512, such as may be associated with the closing of the valve. Contact and/or impact between the seal 510 and the valve seat 512 may be cushioned, at least in part, by slowing the pull-in of the seal 510 toward the valve seat 512. Slowing the pull-in speed of the seal 510 may, at least in part, be achieved by resisting movement of the seal 510, the plunger 508 and/or the armature 506 and/or progressively increasing the resistance on the seal 510, the plunger 508, and/or the armature 506 as the seal 510 moves toward the valve seat 512. The plunger damper 520 may employ various additional and/or alternative mechanisms to cushion contact and/or impact between the seal 510 and the valve seat 512. The plunger damper 520 may, accordingly, reduce and/or eliminate audible noise associated with the closing of the valve.

As shown, the plunger 508 may include a flange 522 configured to engage the plunger damper 520 as the seal 510 moves toward the valve seat 512. The plunger damper 520 may have a configuration as described above. As such, the plunger damper 520 may include an opening and a plurality of inwardly directed resilient fingers. Alternatively, the plunger damper 520 may include a resiliently deflectable member including an opening configured to receive at least a portion of the plunger 508 therethrough. When the valve is closed, i.e., the seal 510 is moved toward the valve seat 512, a plunger flange 522 may engage the plurality of inwardly directed, resilient fingers or the resilient member around the perimeter of the opening. The plunger damper 520 may, accordingly, cushion the closing of the valve.

As illustrated, the core 504 may include a recess 523 that may be configured to at least partially accommodate the flange 522 of the plunger 508. The valve body 514 may include a groove 526 along at least a portion of the circumference of an edge of the valve body 514 that is adjacent to the core 504. The plunger damper 520 may include a lip 524 that may be at least partially disposed within the groove 526 in the valve body 514. In the foregoing manner, at least a portion of the plunger damper 520 may be captured or disposed between at least a portion of the core 504 and the valve body 514. According to an alternative embodiment, the core may include a groove and at least a portion of the lip of the plunger damper may be at least partially disposed within the groove in the core.

According to one particular embodiment, the groove 526 in the valve body 514 may be stepped such that a portion of the inside wall of the valve body 514 defining the groove 526 may be lower than the outside wall defining the groove 526. The inside wall defining the groove 526 may generally be lower by the thickness of the plunger damper 520. Accordingly, when the solenoid 500 is assembled, the outside wall of the valve body 514 may be adjacent to and/or in contact with at least a portion of the core 504. The inside wall of the valve body 514 may be spaced from the core 504 by the thickness of the plunger damper 520. It should be appreciated that, as the plunger damper 520 may be formed from a resilient and/or elastomeric material, the plunger damper 520 may be at least partially compressed between the valve body 514 and the core 504.

The combination of the recess 523 in the core 504 for at least partially accommodating the flange 522 of the plunger 508, and the groove 526 in the valve body 514 for retaining the plunger damper 520 may allow the plunger damper 520 to be used in a solenoid 500 without increasing the height of the solenoid 500. Accordingly, a solenoid 500 consistent with the foregoing embodiment may be suitably employed in applications requiring a short overall solenoid length. The solenoid may also suitably be employed in other application in which the solenoid length is not restricted.

The features and aspects described with reference to particular embodiments disclosed herein may be susceptible to combination and/or application in various other embodiments described herein. Such combinations and/or applications of such described features and aspects to such other embodiments are contemplated herein. Additionally, the embodiments disclosed herein are susceptible to numerous variations and modifications without materially departing from the spirit of the disclosed subject matter. Accordingly, the invention herein should not be considered to be limited to the particular embodiments disclosed herein.

What is claimed is:

1. A solenoid valve comprising:
  a bobbin configured to support a coil;
  a core disposed adjacent to said bobbin;
  an armature movably disposed relative to said core;
  a plunger coupled to said armature, said plunger movable with said armature;
  a seal coupled to said plunger, said seal movable between at least a first position away from a valve seat and a second position sealingly engaged with said valve seat when said solenoid is in an energized condition; and
  a plunger damper comprising a resilient feature configured to engage said plunger when said seal moves toward said second position, said plunger damper being coupled to said core by an undercut region in said plunger damper and a cooperating protrusion of said core configured to be at least partially received in said undercut region.

2. A solenoid according to claim 1, wherein said plunger damper comprises an elastomeric body having an inner wall defining an interior opening and having a bottom portion comprising an opening therethrough, said opening comprising a plurality of inwardly directed fingers.

3. A solenoid according to claim 1, wherein said plunger damper comprises a resilient damping disc supported by a tubular retainer, said resilient damping disc comprising an opening, at least a portion of said plunger extending through said opening, wherein said plunger is configured to engage said damping disc when said solenoid is energized, and to resiliently deflect at least a portion of said resilient damping disc toward said valve seat.

4. A solenoid according to claim 1, wherein at least a portion of said plunger damper is disposed between at least a portion of said core and at least a portion of a valve body, retaining said plunger damper in position.

5. A solenoid according to claim 1, wherein said plunger comprises a flange configured to engage said plunger damper when said plunger is moved toward said second position.

6. A solenoid according to claim 1, further comprising a damper disposed between said armature and said core.

7. A solenoid valve comprising:
  a bobbin configured to support a coil;
  a core disposed adjacent to said bobbin;
  an armature movably disposed relative to said core;
  a plunger coupled to said armature, said plunger movable with said armature;
  a seal coupled to said plunger, said seal movable between at least a first position away from a valve seat and a second position sealingly engaged with said valve seat when said solenoid is in an energized condition;
  a plunger damper comprising a resilient feature configured to engage said plunger when said seal moves toward said second position; and
  an armature damper comprising a resilient member, said armature damper disposed at least partially between said armature and said bobbin wherein said armature damper comprises an elastomeric member at least partially disposed within said armature and at least a portion of said elastomeric member extending between an end of said armature and an adjacent end of said bobbin.

8. A solenoid valve according to claim 7, wherein said plunger damper comprises an elastomeric body having an inner wall defining an interior opening and having a bottom portion comprising an opening therethrough, said opening comprising a plurality of inwardly directed fingers.

9. A solenoid valve according to claim 7, wherein said plunger damper comprises a resilient damping disc supported by a tubular retainer, said resilient damping disc comprising an opening, at least a portion of said plunger extending through said opening, wherein said plunger is configured to engage said damping disc when said solenoid is energized, and to resiliently deflect at least a portion of said resilient damping disc toward said valve seat.

10. A solenoid valve according to claim 7, wherein at least a portion of said plunger damper is disposed between at least a portion of said core and at least a portion of a valve body, retaining said plunger damper in position.

11. A solenoid valve according to claim 7, wherein said plunger comprises a flange configured to engage said plunger damper when said plunger is moved toward said second position.

12. A solenoid valve comprising:
  a bobbin configured to support a coil;
  a core disposed adjacent to said bobbin;
  an armature movably disposed relative to said core;
  a plunger coupled to said armature, said plunger movable with said armature;
  a seal coupled to said plunger, said seal movable between at least a first position away from a valve seat and a second position sealingly engaged with said valve seat when said solenoid is in an energized condition; and
  a plunger damper comprising a resilient feature configured to engage said plunger when said seal moves toward said second position wherein said armature is coupled to said plunger via a damper, said damper comprising an elastomeric material.

13. A solenoid comprising:
a plunger comprising a flange, said plunger movable between a first position and a second position; and
a plunger damper comprising an elastomeric member;
said plunger flange engaging at least a portion of said elastomeric member and resiliently deflecting at least a portion of said plunger damper when said plunger moves toward said second position,
said plunger damper comprising an inwardly opening undercut region, and said solenoid further comprising a core having a protrusion configured to be at least partially received within said undercut region.

14. A solenoid according to claim 13, wherein an opening in said bottom portion of said plunger damper comprises a plurality of fingers extending into said opening, said flange of said plunger configured to engage said fingers when said plunger moves toward said valve seat.

15. A solenoid according to claim 13, wherein said solenoid further comprises a core and a valve body, and wherein at least a portion of said plunger damper is disposed between at least a portion of said core and at least a portion of said valve body.

16. A solenoid according to claim 15, wherein said plunger damper comprises a flange, and said flange is captured between said core and said valve body.

* * * * *